(12) United States Patent
Bailey et al.

(10) Patent No.: US 8,323,779 B2
(45) Date of Patent: *Dec. 4, 2012

(54) CLEANING CARDS

(75) Inventors: Glen Alan Bailey, Minot, ME (US); John Edward Condon, Sumner, ME (US)

(73) Assignee: Kicteam, Inc., Auburn, ME (US)

( * ) Notice: Subject to any disclaimer, the term of this patent is extended or adjusted under 35 U.S.C. 154(b) by 1320 days.

This patent is subject to a terminal disclaimer.

(21) Appl. No.: 10/957,830

(22) Filed: Oct. 4, 2004

(65) Prior Publication Data

US 2006/0019072 A1 Jan. 26, 2006

Related U.S. Application Data

(63) Continuation-in-part of application No. 10/857,382, filed on May 28, 2004, now Pat. No. 7,732,040.

(51) Int. Cl.
*B32B 3/28* (2006.01)
(52) U.S. Cl. ..... 428/179; 428/174; 15/210.1; 15/256.51
(58) Field of Classification Search .................. 428/174, 428/179, 181; 15/210.1, 256.51, 229.12; 399/327
See application file for complete search history.

(56) References Cited

U.S. PATENT DOCUMENTS

| | | | | |
|---|---|---|---|---|
| 4,357,615 A | * | 11/1982 | Yoshiharu et al. | 346/134 |
| 4,791,773 A | * | 12/1988 | Taylor | 52/786.13 |
| 5,030,500 A | * | 7/1991 | Perdelwitz et al. | 428/137 |
| 5,153,964 A | * | 10/1992 | Gelardi et al. | 15/229.12 |
| 5,366,785 A | * | 11/1994 | Sawdai | 428/156 |
| 5,525,417 A | | 6/1996 | Eyler | |
| 5,824,611 A | | 10/1998 | Eyler | |
| 5,832,556 A | | 11/1998 | Eyler | |
| 5,878,458 A | | 3/1999 | Higginbotham | |
| D420,658 S | | 2/2000 | Eyler | |
| 6,107,221 A | | 8/2000 | Nakajima | |
| 6,156,407 A | | 12/2000 | Neubauer et al. | |
| 6,210,490 B1 | | 4/2001 | Michael et al. | |
| 6,243,908 B1 | | 6/2001 | Battle et al. | |
| 6,353,233 B1 | | 3/2002 | Kikuchi et al. | |
| 6,611,985 B1 | | 9/2003 | Neubauer et al. | |

FOREIGN PATENT DOCUMENTS

| | | |
|---|---|---|
| EP | 0944029 B1 | 3/2003 |
| WO | 01/15146 A1 | 1/2001 |

* cited by examiner

*Primary Examiner* — Patricia Nordmeyer
(74) *Attorney, Agent, or Firm* — Fox Rothschild LLP

(57) ABSTRACT

A cleaning card for use in cleaning internal surfaces of a machine-reading mechanism includes a substrate having plurality of discrete raised areas in opposed surfaces thereof. The discrete raised areas each include a peak and a peripheral wall having an edge remote from the peak, and the peak of each raised area is farther from a central plane of the card than the edge of the peripheral wall remote from the peak. Relief means are provided in the substrate for preventing the peaks of at least some of the discrete raised areas from flattening toward the central plane to an extent that such peaks will not effectively engage and clean desired internal surfaces of a machine-reading mechanism when the cleaning card moves in the machine direction in other than a single, substantially linear plane.

23 Claims, 2 Drawing Sheets

CLEANING CARDS

RELATED APPLICATION

This application is a continuation-in-part of application Ser. No. 10/857,382, titled PATTERNED CLEANING CARD AND METHOD OF MANUFACTURING SAME, filed on May 28, 2004. The subject matter of this latter application is hereby fully incorporated by reference herein.

FIELD OF THE INVENTION

This invention relates generally to cleaning cards and more specifically to cleaning cards having the capability of cleaning internal surfaces of various reading mechanisms, such as, reading mechanisms in ATM machines, vending machines including slots for receiving paper currency, turn style machines including slots for receiving a token or card having a magnetic stripe, as well as other reading mechanisms having internal surfaces that require cleaning.

BACKGROUND ART

Many machines have reading mechanisms of the type intended to receive an operating card or other machine-operating substrate (e.g., paper currency) for actuating the operation of a machine, and/or for receiving a substrate including data to be scanned, such as a check. In many reading mechanisms internal surfaces are spaced apart a distance greater than the permissible thickness of the operating card or other operating substrate or a substrate to be scanned, to thereby keep the operating card and/or substrates out of contact with those internal surfaces, particularly internal surfaces of sensing mechanisms, e.g., surfaces of magnetic sensors, optical lenses and other surfaces defining the internal cavity of the reading mechanism. In many of these reading mechanisms, internal rails are provided to actually support the operating card or other substrate in a position out of contact with the sensing mechanisms.

Cleaning cards for us in attempting to clean the above-discussed reading mechanisms are well-known in the yard, and are generally employed to traverse the same path in the reading mechanism that is traversed by the operating card and/or other operating substrate or substrate to be scanned. The most common commercially available cleaning cards are substantially flat substrates that are intended to closely approximate the dimensions of the machine-operating substrate so that they can be received in the reading mechanism for the purposes of cleaning internal surfaces thereof. However, if the maximum thickness of a cleaning card that can be accepted in a reading device of a machine is less than the spacing of the internal surfaces to be cleaned, then the cleaning card will not effectively engage those surfaces to provide its desire cleaning function. This is particularly troublesome in reading devices wherein the machine-operating substrate and cleaning card are inserted through a slot into an enclosed-reading mechanism and actually are pulled into and retained within the enclosed mechanism during the operation and cleaning of the reading device, respectively. In these reading devices, the cleaning card cannot be manually pressed against either of the opposed internal surfaces within the slot, since the user of the card actually relinquishes control over its position when it is pulled into the enclosed mechanism.

Cleaning cards having raised surfaces for cleaning or removing foreign objects from internal machine surfaces are known in the prior art, as exemplified by the disclosures in U.S. Pat. Nos. 6,243,908 (Battle, et al.), 6,107,221 (Nakajima, et al.) and 5,153,964 (Galardi, et al.). A discussion of these latter three patents is included in parent application Ser. No. 10/857,382, which has been fully incorporated by reference herein. Accordingly, that discussion is not repeated herein.

In addition to the above-identified prior art cleaning cards, parent application Ser. No. 10/857,382 discloses and claims an improved, very versatile solution to the problem of cleaning internal surfaces of machine-reading mechanisms, and in particular internal surfaces of sensing mechanisms that are spaced further apart from each other more than the maximum thickness of a substrate that can be received within the mechanism. Moreover, the cleaning cards disclosed and claimed in the '382 application can be employed in virtually all environments in which conventional, prior art cleaning cards have been employed in the past, even in reading devices wherein the prior art cleaning cards actually are capable of engaging internal surfaces of a sensing mechanism to provide effective cleaning of those surfaces.

However, applicants have recognized a potential problem in connection with attempting to clean reading mechanisms with the cleaning cards disclosed in the above-identified '382 pending application, when the path of the machine-operating substrate into the reading mechanism is not in a single, substantially linear plane. For example, in certain scanning devices, such as check scanning devices, a check is directed into an inlet opening and then is conveyed through a curved, substantially 180° bend to an outlet opening. As the check is being conveyed through the curved path, it is read, or scanned by a reading mechanism. Also, in some reading mechanisms for receiving and identifying paper currency to actuate or operate a machine, e.g., a product dispensing machine, the paper currency is directed into the reading mechanism in a first linear plane, and then the forward, or leading, end of the currency is caused to bend downwardly into a second plane to be fed into a collection bin.

It has been discovered that raised surfaces in cleaning cards of the type described and claimed in co-pending application Ser. No. 10/857,382 tend to flatten out and not engage internal surfaces requiring cleaning when the cleaning cards either are caused to move through a curved, non-linear path, and/or when the forward, or leading, end of a cleaning card bends downwardly to follow the same general path as the paper currency employed to operate a machine, as described above. In both of these latter systems, the movement of a cleaning card out of a single, substantially linear plane tends to apply machine-direction tension to the card, resulting in a flattening of the raised cleaning surfaces in locations where they are required to be elevated to clean internal surfaces of the reading mechanism.

Applicants also have determined that improvements are desired for cleaning internal feed rolls generally located at least at the entrance of reading mechanisms that receive a machine operating substrate or other substrate to be read or scanned.

The present invention includes improvements to prevent raised surfaces of cleaning cards from flattening to an unacceptable level in which they do not function to adequately clean desired internal surfaces, when a cleaning card, or a portion thereof, moves through more than one linear plane. Moreover, in accordance with another aspect of the invention, the cleaning cards include further features for enhancing the cleaning of feed rolls in machine reading mechanisms.

SUMMARY OF THE INVENTION

In accordance with one aspect of this invention, cleaning card structures for use in cleaning internal surfaces of a machine-reading mechanism of the type intended to receive an operating card or other substrate to be scanned by the machine and/or read for actuating the operation of a machine, include a substrate having a central plane between opposed surfaces thereof, a machine direction dimension defined between opposed end edges and a transverse direction dimension defined between opposed side edges. The opposed surfaces each have a plurality of discrete raised areas, at least some discrete raised areas extending outwardly on each side of the central plane. The discrete raised areas each include a peak and a peripheral wall having an edge remote from said peak, said peak of each raised area being further from the central plane than the edge of the peripheral wall remote from said peak. The cleaning card substrate has an effective thickness between the opposed surfaces that is greater than the nominal thickness between those surfaces, and relief means are provided in said substrate for preventing the peaks of at least some of said discrete raised areas from flattening toward the central plane to an extent that such peaks will not effectively engage and clean desired internal surfaces when the cleaning card is subjected to machine-direction tension resulting from movement of the card in other than a single, substantially linear plane or path in a machine-reading mechanism.

The relief means preferably are in the form of slits, slots, or cuts through the substrate, which dissipate the machine direction tension without excessive flattening or collapsing of those peaks required to provide a cleaning function.

In the most preferred embodiments, substantially all of the discrete raised areas have a peak and a peripheral wall terminating at a peripheral edge remote from said peak and being disposed closer to the central plane of said substrate than said peak, said cleaning card substrate having an effective thickness between the opposed surfaces that is greater than the nominal thickness between those surfaces.

In certain preferred embodiments the discrete raised areas extend over substantially the entire surface of each of the opposed surfaces and in other embodiments some of the card surface can be maintained free of raised areas.

Most preferably, the raised areas are disposed in a plurality of transversely extending rows spaced from each other in the machine direction, and every other raised area in each transversely extending row is on one side of the central plane of the substrate and the other raised areas in each transversely extending row are on the other side of the central plane of the substrate. Most preferably the effective thickness of these latter cleaning cards is more than three times their nominal thickness.

In certain preferred embodiments of this invention at least some of the discrete raised areas on each side of the central plane, and most preferably all of said discrete raised areas, have complimentary, underlying recessed areas.

In certain preferred embodiments, transverse rows of discrete raised areas are separated in the machine direction by generally planar sections of the cleaning card substrate, which are free of raised areas; the nominal thickness of the cleaning card substrate being substantially the same in the spaced apart raised areas and in the generally planar sections between said raised areas. In this embodiment it is most preferred to include the relief means, preferably in the form of slits, slots or cuts, in the generally planar sections, with such slits, slots or cuts being spaced-apart from each other in the transverse direction.

In certain preferred embodiments of this invention at least some of the raised areas have side margins extending in the machine direction that are separated from adjacent regions of the cleaning card substrate; most preferably by cuts. These cuts extend generally in the machine direction of the card and are distinct from the cuts that function as relief means when the card is placed under a stretching, or machine-direction tension or force imposed upon the card when said card is moved in a path other than a single, substantially linear path.

In the most preferred embodiments of this invention including raised areas provided in transversely extending rows spaced apart from each other in the machine direction by substantially planar areas, the raised areas in at least one of the transversely extending rows are transversely offset from raised areas in an adjacent transversely extending row so that a surface of at least the peripheral wall of at least one raised area in said adjacent rows on each side of said central plane is located in the machine direction along the entire transverse dimension of the substrate.

In accordance with another aspect of this invention, a cleaning card having opposed upper and lower surfaces for cleaning internal surfaces of a machine-reading mechanism of the type intended to receive an operating card or other substrate to be scanned by the mechanism and/or read by the mechanism for actuating the operation of a machine, also includes, in a transversely extending section adjacent at least one end edge thereof, closely spaced-apart embossments for providing a frictional gripping region on both of the opposed surfaces of the cleaning card for being effectively gripped by roller means forming part of the machine reading mechanism. This latter aspect of the invention can be employed in cleaning cards of all designs, both substantially flat and patterned with raised areas or peaks for cleaning internal surfaces of the machine reading mechanism.

Preferably, the closely space-apart embossments are provided adjacent both end edges, and if desired over the entire surface of the card, to aid in positively gripping all sections of the card engaged by feed rollers of a machine reading mechanism.

In accordance with a preferred method of this invention for cleaning feed rollers of an internal machine reading mechanism of the type intended to receive an operating card or other substrate to be scanned by the machine and/or read for actuating the operation of a machine, a cleaning card is provided that includes a substrate having opposed upper and lower surfaces for cleaning internal surfaces of the machine reading mechanism, a machine direction dimension defined between opposed end edges and a transverse direction dimension defined between opposed side edges, at least a transversely extending section adjacent at least one end edge including closely spaced-apart embossments for providing a frictional gripping region on both of the opposed surfaces of the cleaning card to be effectively gripped by the feed rollers. In accordance with the method, the cleaning card is partially inserted into the machine-reading mechanism to actuate rotation of the rollers, with the rollers in engagement with the closely spaced-apart embossments of said cleaning card, and a retarding force is applied to the cleaning card to prevent its linear movement while permitting the rollers to rotate relative to and in engagement with the spaced-apart embossments for cleaning said rollers. The retarding force preferably is manually applied by a user of the card gripping a rear, or trailing, end thereof which extends out of the reading mechanism.

Most preferably, the closely spaced apart embossments are provided adjacent each end edge so that the either end of the cleaning card can be inserted into the machine reading mechanism to provide the desire roll cleaning function. In fact, if desired the closely spaced apart embossments can be provided over the entire surface of the cleaning card.

Reference throughout this application to "effective thickness" means the thickness dimension between planes that are parallel to each other and are tangent to the highest points (e.g., peaks) on opposite sides of the central plane.

Reference throughout this application to "nominal thickness" means the thickness of the actual substrate normal to, and between the opposed surfaces of the substrate. In a flat cleaning card, which can be employed in accordance with certain features of the invention, the "effective thickness" and the "nominal thickness" are the same.

Reference throughout this application to "apex," "peak," "apices" or "peaks" refers to the highest location of the discrete raised areas in accordance with certain preferred embodiments of the invention, which unless specifically limited, can be a flat surface, the upper region of a curved surface, a linear edge, or a point.

Reference throughout this application to "peripheral wall" in referring to a portion of a discrete raised area means both a continuous wall extending about the peak, or apex, of a discrete raised area, as well as an interrupted peripheral wall having two or more spaced-apart segments about the apex of a discrete raised area. In particular, reference to "peripheral wall" in this application is a generic term encompassing, inter alia, the peripheral wall structure in all embodiments specifically described and shown in FIGS. 1-9 of co-pending application Ser. No. 10/857,382, the subject matter of which already has been incorporated by reference herein.

Reference in this application to discrete raised areas being "disposed" in any specified direction does not require that the discrete raised areas be actually spaced apart from each other by substantially flat, non-raised surfaces. In other words, the reference to "disposed" in describing the positional relationship between, or among discrete raised areas describes an arrangement wherein adjacent discrete raised areas include peripheral wall edges remote from the apices of said adjacent discrete raised areas, which edges either are in contact with each other or are spaced apart from each other by undeformed regions of the cleaning card substrate.

BRIEF DESCRIPTION OF THE DRAWINGS

The invention will be described in conjunction with the following drawings in which like reference numerals designate like elements and wherein.

DETAILED DESCRIPTION OF THE INVENTION

Figure 1:
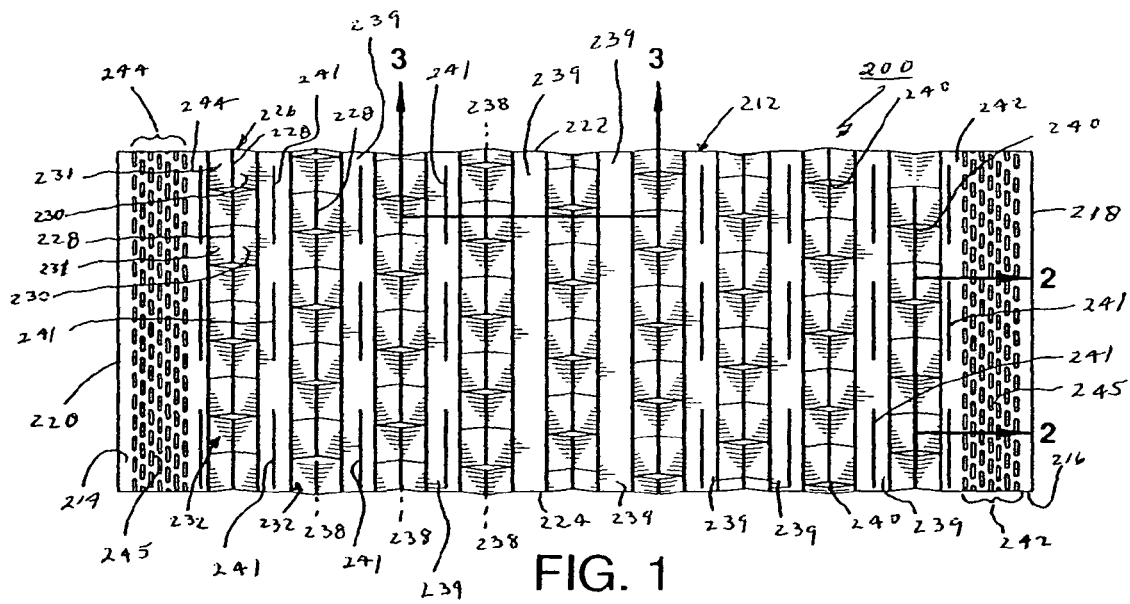
FIG. 1 is a plan view of one embodiment of the invention, employing several features of the invention.
Figure 2:
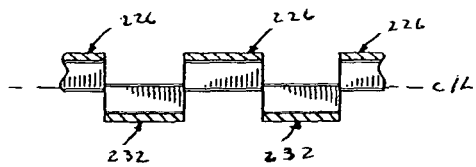
FIG. 2 is a sectional view along line 2-2 of FIG. 1, showing the central plane by line C/L.
Figure 3:
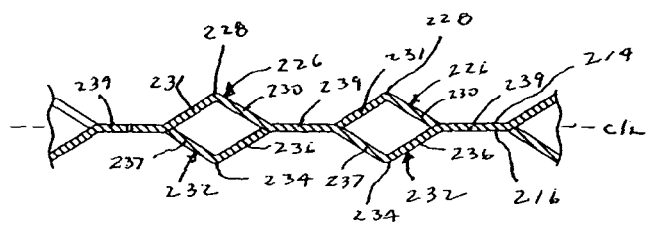
FIG. 3 is a sectional view along line 3-3 of FIG. 1, showing the central plane by line C/L.

Referring to FIGS. 1-3, a preferred embodiment of a cleaning card in accordance with this invention is illustrated at 200. The cleaning card 200 includes a substrate 212 having opposed surfaces 214, 216 on opposite side of central plane C/L, opposed end edges 218, 220 defining the machine direction dimension of the cleaning card 200, and opposed side edges 222, 224 defining the transverse direction dimension of the cleaning card 200.

The substrate 212 includes discrete raised areas 226 on one side of the central plane C/L, each of said raised areas including a peak 228 joined to a sloping peripheral wall including segments 230, 231. In addition, the substrate 212 includes discrete raised areas 232 extending on the other side of the central plane C/L, each of said latter discrete raised areas including a peak 234 and a sloping peripheral wall including segments 236, 237.

As can be seen best in FIG. 1, the discrete raised areas 226 and 232 are disposed in both the transverse direction and the machine direction of the substrate 212 so as to dispose those discrete raised areas in a plurality of transversely extending rows 238 that are spaced apart from each other in the machine direction dimension. As can be seen best in FIG. 3, each of the transverse rows 238 is spaced apart from an adjacent transverse row by a substantially planar segment 239. The transverse rows 238 of raised areas either can be normal to opposed side edges 222, 224, as illustrated, or canted at a different angle to said side edges, as desired. Moreover, in connection with the broadest aspect of this invention the discrete raised areas can be randomly disposed, so that they are not in transversely aligned rows. However, including the discrete raised areas in transversely extending rows is the preferred arrangement employed in this invention.

Referring specifically to FIGS. 1 and 2, each of the transversely extending rows 238 is provided by a series of alternating discrete raised areas 226 and discrete raised areas 232, respectively.

Referring to FIG. 1, in the preferred embodiment of the invention the adjacent discrete raised areas 226 and 232 are separated by slits or cuts 240 extending in the machine direction to provide open areas for entrapping debris during the cleaning of a machine-actuating mechanism. As is further illustrated in FIG. 1, in a preferred embodiment of this invention the discrete raised areas in adjacent rows 238 are transversely offset relative to each other so that the cut regions or slots 240 in each transverse row are transversely offset from the cut regions, or slots 240 in each adjacent transverse row. In this construction, internal surfaces of the machine-actuating mechanism to be cleaned will be exposed to solid surfaces of discrete raised areas 226 over the entire transverse extent of the substrate 212, and also to solid surfaces of discrete raised areas 232 over the entire transverse extent of said substrate. In other words, in all machine direction locations of cleaning card 200 a plurality of solid surfaces (as opposed to cuts) of discrete raised areas of 226 and 232 exist. In this preferred embodiment, there is no continuous machine-direction location occupied only by slits or cuts 240 joining the adjacent discrete raised areas 226 and 232 in each transverse row 238.

As is readily apparent from FIGS. 1 and 3, the peaks 228 and 234 of the discrete raised areas 226, 232, respectively, are provided by substantially sharp creases, and these creases are joined to substantially planar sections of the substrate 212 through a sloping peripheral wall including interrupted segments 230, 231 and a sloping peripheral wall including interrupted segments 236, 237, respectively.

Referring to FIGS. 1 and 3, the cleaning card 200 in accordance with improved features of this invention includes relief areas 241 in the substrate 212 for preventing the peaks 228, 234 of at least some of said discrete raised areas 226, 232 from flattening toward the central plane to an extent that such peaks will not effectively engage and clean desired internal surfaces of a machine-reading mechanism when the cleaning card is subjected to machine-direction tension resulting from movement of the card in other than a single, substantially linear plane or path in said machine-reading mechanism.

The relief areas preferably are in the form of slits, slots, and/or cuts through the substrate 212, which dissipate the machine direction tension without excessive flattening or collapsing of the peaks 228, 234 that are required to remain in a substantially uncollapsed state to provide a desired cleaning function. In the illustrated embodiment, the relief areas 241 are discrete slits or cuts extending through the substrate 212 in substantially planar segments 239 of the card. In the illustrated embodiment, the slits 241 are spaced apart along a transverse line in each of the planar segments 239 in which they are located. It should be understood that the required location of the relief areas will be dictated by the location of discrete raised areas 226 and/or 232 that need to be maintained in a raised condition to provide a desired cleaning function and also by the path of travel required of the cleaning card.

For example, when cleaning a sensor(s) located in a slot adapted to receive and sense paper currency, where the sensor(s) is (are) located upstream of a location in the slot where the cleaning card is required to change direction (e.g., move from a horizontal path to a downward path), the relief slots may need to be employed only in forward, or leading, sections of the card that first encounter the change in direction. Including the relief slots in this latter location may dissipate the machine direction tension or stress imposed upon the card as it changes direction, thereby preventing this stress or tension from acting upon, and flattening, upstream raised areas 226 and/or 232 in the region(s) where they are required to remain substantially uncollapsed to clean the sensor(s). The cleaning card 200 shown in FIG. 1 may be well suited for use in the above-described environment.

Where the slot is substantially U-shaped, such as the slot in check readers, where a check is inserted into one leg of the U-shaped slot, moves about a curved arc at the bottom of the slot, which may include a sensor or other surface requiring cleaning, and is then directed back to the user through the other leg of the U-shaped slot, it may be necessary or desirable to prevent collapse of the raised areas in all transverse rows. Thus, it may be necessary or desirable to include the relief areas in the form of transversely spaced apart slots, cuts or slits, in substantially all of the planar segments 239 located between the adjacent transverse rows 238 of raised areas in the substrate 212.

It also should be noted that in accordance with a preferred feature of the invention end regions 242, 244 of the substrate 212 adjacent each of the opposed end edges 218, 220 include closely spaced-apart, small embossments 245. As is apparent from FIG. 1, the closely spaced-apart embossments 245 are disposed in both the machine direction and transverse direction in each of the end regions 242, 244 for providing a frictional gripping region on both of the opposed surfaces 214, 216 of the substrate, which can be effectively gripped by rolls or rollers employed in the machine reading mechanism to be cleaned. It should be apparent that the closely spaced-apart embossments are of a height substantially lower the height of the raised areas 226, 232, and are spaced closely together to provide textured surfaces that can be effectively gripped by rollers of the machine-reading mechanism. The exact configuration and pattern of the embossments can be varied widely within the scope of the invention. The important feature is that the embossments provide a sufficiently textured surface to permit positive gripping by feed rolls of the machine-reading mechanism to be cleaned. Also, in accordance with a most preferred embodiment to be described later herein, the embossments should provide a sufficiently textured surface to clean feed rolls of the machine-reading mechanism.

Preferably, the closely space-apart embossments are provided in both end regions 242, 244, and, if desired, over the entire opposed surfaces of the card, to aid in the positive gripping of all sections of the card engaged by feed rollers of the machine reading mechanism to be cleaned. In either of these latter arrangements (i.e., the embossments being in both end regions or over the entire extent of the card) either end of the cleaning card can function as the leading end to be inserted in a slot of a machine-reading mechanism. However, it is within the scope of the broadest aspect of this invention to include the closely spaced-apart embossments in only one of the end regions, 242, 244. In this latter case, the end region including the embossments is desirably employed as the leading end for insertion into a machine-reading mechanism to be cleaned.

It also should be understood that in accordance with the broadest aspect of this invention, providing closely spaced-apart embossments also can be employed in cleaning cards that have arrangements of peaks or raised areas different from those employed in the preferred embodiments of this invention, and also can be employed on conventional, substantially flat cleaning cards. It should be apparent that the provision of the closely spaced-apart embossments does not alter the substantially planar characteristic of the region, or regions of the cleaning card in which such embossments are disposed.

In a representative embodiment of the invention, the cleaning card 200 has a transverse dimension of approximately 2½ inches, with the transverse dimension of each discrete raised area 226, 232 being approximately 0.285 inches wide. In addition, the discrete raised areas 226, 232 in adjacent transverse rows 238 are transversely offset from each other approximately 0.03 inches, to thereby stagger the orientation of the slits or slots 240 in the machine direction of feed of the card into the machine-actuating mechanism to be cleaned.

Figure 4:
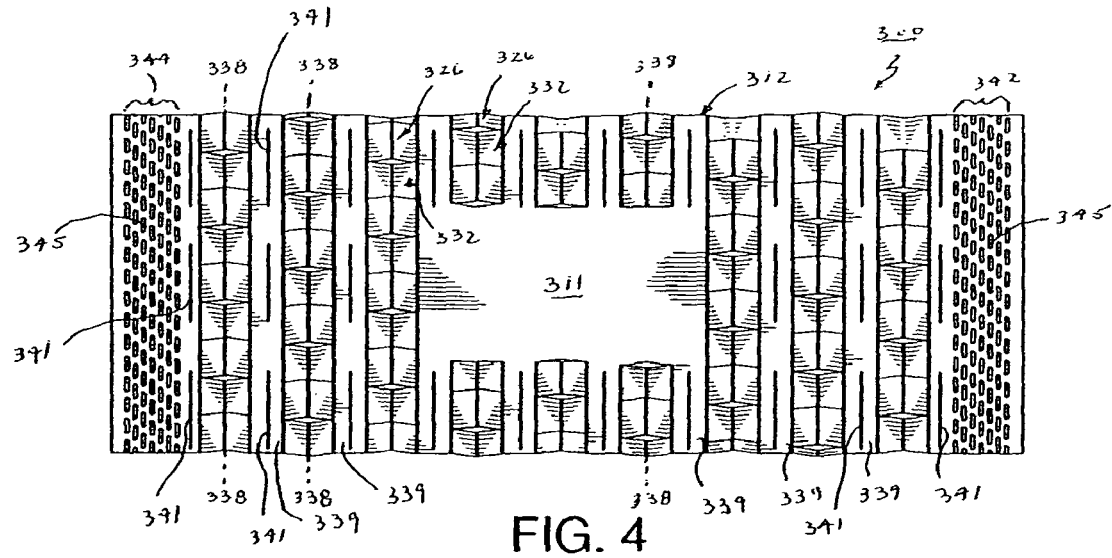
FIG. 4 is a plan view of another embodiment of the invention.

Referring to FIG. 4, an alternative embodiment of a cleaning card is illustrated at 300. This cleaning card is substantially identical to the cleaning card 200. That is, discrete raised areas 326, 332 in the cleaning card 300 are formed in the identical shape as the discrete raised areas 226, 232 in the cleaning card 200.

One difference between the cleaning card 300 and the cleaning card 200 is that a central region 311 of the cleaning card 300 is provided by a substantially flat portion of the substrate 312 that is free of raised areas. This results from interrupting the transverse dimension of the three central transverse rows 338 of discrete raised areas. A second difference relates to the illustrated location of relief slots 341.

For some applications, it may be desirable to provide a substantially planar central region 311 to permit easy gripping of the cleaning card 300 by a suction pick-up device that commonly is employed in connection with automated pouching equipment, wherein one or more cleaning cards 300 is pre-packaged in a pouch. Such pouching equipment is well known to people skilled in the art and needs no further explanation herein.

As illustrated, the relief slots 341 are located in all planar segments 339 located between the transverse rows 338 of discrete raised areas 326, 332. As illustrated, there is a tension relief area 341 located in machine direction alignment with virtually all of the discrete raised areas. For some cleaning applications this arrangement of relief areas may be highly desirable. In fact, such an arrangement of relief areas 341 may result in a cleaning card having more universal application than one wherein relief areas or slots are only selectively located relative to certain discrete raised areas.

As should be apparent from FIG. 4, the substrate 312 of cleaning card 300 includes end regions 342, 344 having an arrangement of closely spaced-apart, small embossments 345 that are the same as the embossments 245 employed in the cleaning card 200. As in the cleaning card 200, the embossments can be applied adjacent one or both ends, or over the entire extent of the substrate 312.

Figure 5:
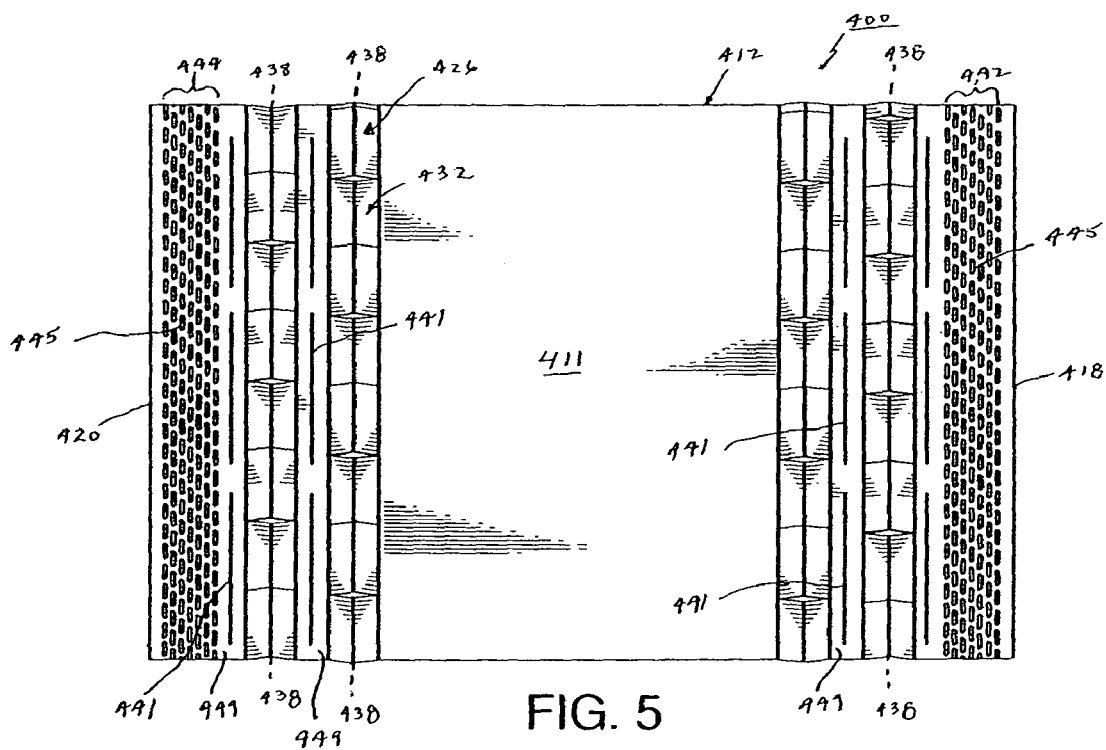
FIG. 5 is a plan view of yet another embodiment of the invention.

Referring to FIG. 5, yet another embodiment of a cleaning card is illustrated at 400. This cleaning card 400 is generally wider than the previously disclosed cleaning cards, but does include, in the preferred embodiment, a substrate 412 having the same structure of discrete raised areas 426,432 as the discrete raised areas 226,232 employed in the cleaning card 200. In the illustrated embodiment, the discrete raised areas 426, 432 are provided in transversely extending, parallel rows 438. Two of the rows 438 are adjacent one end edge 418 of the cleaning card, and the other two rows 438 are adjacent the other end edge 420 of the cleaning card. Transverse regions 442, 444 of the cleaning card 400 adjacent the end edges 418, 420, respectively, include closely spaced-apart, small embossments 445 that are the same as the embossments 245 employed in the cleaning card 200 and the embossments 245 employed in the cleaning card 300. As in the cleaning card 200, the embossments 445 can be applied adjacent one or both ends, or over the entire extent of the substrate 412. Although embossments 445 are provided in the regions adjacent each end edge 418, 420, these regions are substantially planar and can each function as a leading edge to be directed into a machine-actuating mechanism to be cleaned.

As illustrated, relief areas 441, in the form of slits or cuts 441 are located in planar segments 449 located between the two transverse rows 438 of discrete raised areas 426,432 and also in the planar segment between each region 442, 444 of small embossments 445 and an adjacent transverse row 438 of discrete raised areas. Also as illustrated, there is a tension relief area located in machine direction alignment with almost all of the discrete raised areas. For some cleaning applications this arrangement of relief areas may be highly desirable. In fact, such an arrangement of relief areas 441 may provide a cleaning card having more universal application than one wherein relief areas are only selectively located relative to certain discrete, select raised areas.

The cleaning card 400 is well suited for use in cleaning thermal printers, which is a direct contact system in which a print head burns media into a paper. In the cleaning card 400, central section 411 is a substantially planar region and is adapted to actually engage the print head and provide a burnishing function. In this structure, the cleaning card 10 is actually adapted to pick up dust both before and after the print gate of the thermal printer, by providing the central planar burnishing section 411 between the pairs of rows 438 of discrete raised areas disposed adjacent each end edge 418, 420 of the cleaning card.

It should be understood that the discrete raised areas 426, which extend on one side of the central line of the substrate engage a print head to provide a burnishing function and the discrete raised areas 432 extending on the opposite side of the central plane also engage a print head disposed in contact with that side of the cleaning card. For this application, it might not be necessary to include relief slots 441 in the structure. However, the inclusion of the relief slots provides added assurance that any machine direction tension or force imposed upon the cleaning card will not cause the raised areas 426 and 432 to flatten and fail to provide their desired cleaning function.

It should be understood that the required location of relief areas in the cleaning cards of this invention will be dictated by the pattern of raised areas in the cleaning card, the path that the cleaning card is required to travel in the mechanism being cleaned, and the location of surfaces that are required to be cleaned by uncollapsed raised areas of the cleaning card.

Also, as in the cleaning card 200, in the cleaning cards 300 and 400 the transverse rows 338, 438 of raised areas, respectively, can either be normal to the side edges of the cards, as illustrated, or can be canted at a different angle to said side edges, as desired.

The cleaning cards of this invention can be employed in a preferred method of this invention to clean feed rolls or rollers of an internal machine reading mechanism. In accordance with this method, an end region of a card that includes the closely spaced-apart embossments thereon is inserted into engagement with feed rolls of an internal machine reading mechanism to a location which actuates rotation of the feed rolls in engagement with said embossments, and a retarding force is applied to the cleaning card to prevent its linear movement while permitting the rollers to rotate relative to and in engagement with the spaced-apart embossments for cleaning said rollers. The retarding force preferably is manually applied by a user of the card gripping a rear, or trailing, end of the card that extends out of the reading mechanism.

Most preferably, the closely spaced apart embossments are provided adjacent each end edge of the cleaning card, as shown in the cleaning cards 200, 300 and 400, so that either end of the cleaning card can be inserted into the machine reading mechanism to provide the desire roll cleaning function. In fact, if desired the closely spaced apart embossments can be provided over the entire surface of the cleaning card to ensure that the rolls, when caused to rotate, will be in engagement with the texturized surface provided by the embossments.

It should be understood that the materials that can be employed in the cleaning cards of this invention are all well known in the art and do not constitute a limitation on the broadest aspect of this invention. However, a preferred structure is a laminate including a flexible polymeric substrate, such as a polypropylene substrate, provided with opposed, thin, non-woven layers that provide the desired cleaning function. Most preferably each of the non-woven layers is an absorbent, spunlaced, non-woven material sold under the trademark Sontara by du Pont de Nemores and Company in Wilmington, Del. As noted, in this preferred construction the flexible substrate is the core and, although flexible, has the necessary rigidity to permit use of the substrate in a cleaning card structure.

The completed laminate, including the plastic core and spunlaced surface layers, can be obtained from Bixby International, located in Newbury Port, Mass. However, it should be understood that the unique features of this invention can be employed with cleaning card structures of a variety of different materials, which can easily be ascertained by individuals skilled in the art.

It should be noted that it is within the scope of this invention to specifically form the cleaning cards of this invention with the embossed pattern being determined, in part, by the specific reading mechanisms to be cleaned. Specifically, the location of various internal surfaces to be cleaned may dictate the arrangement and location of embossments in the cleaning cards in this invention.

Without further elaboration the foregoing will so fully illustrate our invention that others may, by applying current or future knowledge, readily adapt the same for use under various conditions of service.

What we claim as our invention is the following:

1. A cleaning card for use in cleaning internal surfaces of a machine component, said cleaning card including a substrate having a central plane between opposed surfaces thereof, a machine direction dimension defined between opposed end edges and a transverse direction dimension defined between opposed side edges, said opposed surfaces each having a plurality of discrete raised areas, at least some discrete raised areas extending outwardly on each side of said central plane, said discrete raised areas each including a peak and a peripheral wall, said peripheral wall having sloping sections extending from the peak in the machine direction on opposed sides of said peak and being joined to said substrate, said peak of each raised area being intermediate said sloping sections of said raised area and being further from the central plane than the edge of each of said sloping sections joined to said substrate, said cleaning card substrate having an effective thickness between the opposed surfaces that is greater than the nominal thickness between those surfaces for cleaning said internal surfaces when said machine component is closed, and elongate relief means in said substrate, said relief means being elongated in the transverse direction, said transverse direction dimension being greater than the machine-direction dimension of said relief means, said elongate relief means being in machine-direction locations in the substrate that are free of discrete raised areas for preventing the peaks of at least some of said discrete raised areas from flattening toward the central plane to an extent that such peaks will not effectively engage and clean desired internal surfaces of the closed machine component to be cleaned when the cleaning card moves in other than a single, substantially linear plane.

2. The cleaning card of claim 1, wherein said relief means include slits, slots and/or cuts extending through the substrate in a transverse direction.

3. The cleaning card of claim 2, including a plurality of transversely extending rows of relief means, the slits, slots and/or cuts in each row of relief means being spaced apart from each other in a transverse direction.

4. The cleaning card of claim 2, wherein at least some of said discrete raised areas on each side of said central plane have an underlying recessed area.

5. The cleaning card of claim 2, wherein side margins of at least some of said raised areas extending in the machine direction are separated from adjacent regions of said cleaning card substrate.

6. The cleaning card of claim 5, wherein said raised areas that are separated from adjacent regions of said cleaning card substrate are separated by cuts.

7. The cleaning card of claim 1, wherein said discrete raised areas are disposed in a plurality of transversely extending rows, said plurality of transversely extending rows being spaced-apart in the machine-direction, at least some discrete raised areas in at least some of the transversely extending rows extending outwardly on each side of said central plane, said relief means including slits, slots and/or cuts extending through said substrate in the transverse direction in regions of the substrate between at least two transversely extending rows.

8. The cleaning card of claim 7, including a plurality of transversely extending rows of slits, slots and/or cuts, said slits, slots and/or cuts in each row being spaced apart from each other in a transverse direction.

9. The cleaning card of claim 7, wherein adjacent, transversely extending rows of discrete raised areas are spaced apart from each other in the machine direction by substantially planar sections free of discrete raised areas, the nominal thickness being substantially the same in transversely extending rows of discrete raised areas and the spaces between said transversely extending rows, said relief means being slits, slots and/or cuts through said substrate in said substantially planar sections.

10. The cleaning card of claim 9, including a plurality of transversely extending rows of said slits, slots and/or cuts, such slits, slots and/or cuts in each row being spaced apart from each other in a transverse direction.

11. The cleaning card of claim 7, wherein the raised areas in each transversely extending row are transversely offset from the raised areas in adjacent transverse rows.

12. The cleaning card of claim 1, wherein every other raised area in each transversely extending row is on one side of the central plane and the other raised areas in each transverse row are on the other side of said central plane.

13. The cleaning card of claim 1, wherein said effective thickness is more than three times the nominal thickness.

14. The cleaning card of claim 1, wherein at least some of said discrete raised areas on each side of the central plane have an underlying recessed area.

15. The cleaning card of claim 1, wherein at least some of said discrete raised areas are spaced apart from each other in the machine direction by substantially planar sections free of discrete raised areas, said relief means being in said substantially planar sections.

16. The cleaning card of claim 1, wherein said raised areas are compressible by a feeding mechanism that directs the cleaning card into a machine component having internal surfaces to be cleaned and are expandable upon release by said feeding mechanism.

17. The cleaning card of claim 1, wherein the nominal thickness of said cleaning card is less than the spacing of opposed internal surfaces of the machine component to be cleaned and wherein the effective thickness of said cleaning card is at least as thick as the spacing of said opposed internal surfaces to be cleaned.

18. The cleaning card of claim 1, wherein side margins of at least some of said raised areas extending in the machine direction are separated from adjacent regions of said cleaning card substrate.

19. The cleaning card of claim 18, wherein said raised areas that are separated from adjacent regions of said cleaning card substrate are separated by cuts.

20. The cleaning card of claim 1, wherein at least some of said raised areas have a transverse dimension that is less than the transverse distance between transversely spaced-apart guard members of internal surface regions of a machine component for engaging and cleaning said internal surface regions between said guard members, said guard members maintaining a machine-operating substrate out of engagement with said internal surface regions as part of the normal operation of a machine.

21. The cleaning card of claim 1, wherein the peripheral wall edge remote from the peak in substantially all of said discrete raised areas includes segments spaced-apart in the machine direction that are continuous extensions of said substrate, said peaks being in an intermediate region between said segments.

22. The cleaning card of claim 21, said relief means being slits, slots and/or cuts extending through said substrate in a transverse direction, each of said relief means being aligned in the machine direction with at least a portion of one of said segments of the peripheral wall edge of at least some of said discrete raised areas.

23. The cleaning card of claim 22, including a plurality of transversely extending rows of slits, slots and/or cuts, the slits, slots and/or cuts in each row being spaced apart from each other in a transverse direction.

* * * * *